United States Patent [19]

Termansen

[11] 4,144,712
[45] Mar. 20, 1979

[54] HYDRAULIC STEERING DEVICE

[75] Inventor: Paul E. Termansen, Sonderborg, Denmark

[73] Assignee: Danfoss A/S, Denmark

[21] Appl. No.: 823,924

[22] Filed: Aug. 12, 1977

[30] Foreign Application Priority Data

Aug. 19, 1976 [DE]  Fed. Rep. of Germany ....... 2637332

[51] Int. Cl.² .......................... F15B 9/08; B62D 5/06
[52] U.S. Cl. ....................................... 60/384; 60/386; 91/375 A
[58] Field of Search .......................... 60/384, 385, 386; 91/375 A

[56] References Cited

U.S. PATENT DOCUMENTS

| 3,360,932 | 1/1968 | Lech et al. | 60/386 |
| 3,452,543 | 7/1969 | Goff et al. | 60/384 |
| 3,801,239 | 4/1974 | Larson | 60/384 X |

Primary Examiner—Edgar W. Geoghegan
Attorney, Agent, or Firm—Wayne B. Easton

[57] ABSTRACT

The invention relates to a power steering system of the metering type. Units of this type most commonly utilize gerotor type gear sets for the metering operation. During emergency operation when pressurized operating fluid is not available from a pump, steering is accomplished by operating the metering motor with the steering wheel which provides a pumping function for manually creating pressurized fluid. A problem with this type of unit is that a substantial amount of manual exertion is required to steer the vehicle under these conditions. Control units of this type have a universal drive between the rotatable valve thereof and the inner gerotor gear which has a combination rotating and orbiting movement. In this invention the universal drive has two main sections with a lost motion emergency device between the opposite ends. The emergency clutch device allows a sufficient relative displacement between the distributing valve and the inner wheel of the gerotor to provide an out-of-phase condition wherein fluid from the inlet port into both the expanding and contracting chambers of the metering gear set to substantially reduce the feed volume and consequently the steering forces to be applied.

5 Claims, 5 Drawing Figures

HYDRAULIC STEERING DEVICE

The invention relates to a hydraulic steering device, the main valve of which opens on turning a steering shaft in dependence on the direction of rotation and passes a pressure medium from a source of pressure medium to an operating motor and is closed again by a measuring motor disposed hydraulically in series with the operating motor, the measuring motor being an interior axis rotary piston motor with two meshing gears forming compression chambers between each other and being associated with a distributing valve of which each of both parts is fixed for rotation with one of the gears, at least one of these by way of rotational entrainment apparatus, e.g. a carden shaft, of which the first part has one valve aperture leading to each compression chamber and the second part comprises distributing apertures which co-operate with the valve apertures, the number of which is twice the number of teeth of the associated gear and which are alternately connected to the inlet and outlet, including emergency control means wherein the steering shaft drives the measuring motor by way of a lost motion clutch as a pump.

Such steering devices are known in prior art. They have the advantage that, on failure of the pump for the pressure medium, the steerability is not lost in so far that steering is possible by hand during emergency control operation. However, really substantial forces or torques have to be applied to the steering shaft, especially in the case of large steering devices.

The invention is therefore based on the problem of providing a steering device of the aforementioned kind in which steering during emergency control operation can be effected with smaller torques, i.e. smaller manual forces.

This problem is solved according to the invention by a torque clutch which permits relative rotation through a predetermined angle in both directions of rotation out of the normal position between the gear that is driven during emergency control operation and the distributing valve part which is connected thereto for rotational entrainment, and by actuating means which effect rotation during emergency control operation.

By means of this relative rotation between the distributing valve part and the associated gear, the distributing function of the valve is altered in a way such that not all of the compression chambers on the one side of the plane of symmetry determined by the axes of the gears are connected to the inlet and the compression chambers on the other side to the outlet; instead, compression chambers on both sides of the plane of symmetry are connected to each other by way of the distributing valve. The result of this is that the feeding capacity of the measuring motor acting as a pump is considerably reduced, e.g. to one third, so that the forces and torques required to operate the pump are correspondingly reduced. The fact that the speed of steering is also decreased is of secondary importance because during emergency control operation it has always been the steerability but not the speed of steering that was important.

Optimum results are obtained in connection with reducing the volume that is fed if the predetermined angle is about 30 to 40% of the pitch of the distributing apertures. For a gear with six teeth, an angle of about 10 to 12° is then obtained.

In particular, the angle can be predetermined by abutment faces of the torque clutch. This gives a specific angular position during emergency control operation.

In a preferred embodiment, the torque clutch and the actuating means are built into the rotational entrainment apparatus between the gear and distributing valve part and the actuating means respond when the transmitted torque exceeds a predetermined limiting value. During normal operation, a torque is transmitted through the connecting means that is merely required to carry along the associated distributing valve part during rotation. However, during emergency control operation the entire torque must be transmitted to drive the pump. Consequently, the torque is a precise parameter for actuating the rotation.

With particular advantage, provision is made for the cardan shaft to consist of two sections which each carry an articulated head, are connected by spring means transmitting the normal operating torque and have a lost motion clutch between them. During normal operation, the torque is transmitted through the spring means. During emergency control operation, the spring means act as actuating means permitting rotation between the two cardan shaft sections. The torque is then transmitted through the lost motion clutch.

In particular, the spring means may be a torsion spring rod extending lengthwise of the cardan shaft axis. However, other spring means are also possible, for example leaf springs which extend in the direction of the diameter through aligned slots in both sections and which are known, for example, for the mutual centering of the two parts of the main valve.

The invention will now be described in more detail with reference to an example illustrated in the drawing, wherein.

Figure 1:
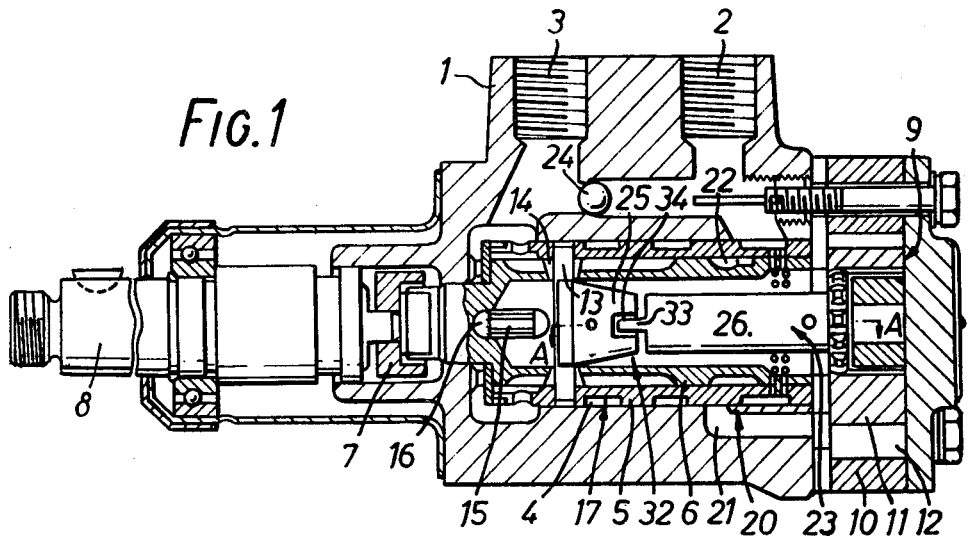
FIG. 1 is a longitudinal section through a partially diagrammatically illustrated steering device according to the invention.

In a housing 1 with a connection 2 for the pump and a connection 3 for the tank there is a bore 4 in which a first sleeve-like rotary valve 5 is mounted. A second rotary valve 6 is concentrically mounted in the first. This second valve is connected to a steering shaft 8 by a coupling 7. Further, a measuring motor 9 is provided which comprises a gear ring 10 with seven teeth and a gear 11 with six teeth, compression chambers 12 being formed between these gears. The gear 11 is connected for rotation together with the first rotary valve 5 by way of a cardan shaft 23 and a pin 13. The pin passes through peripherally larger holes of the second rotary valve 6 so that a lost motion clutch 14 is formed between the two rotary valves. Leaf springs 15 pass through slots 16 in both rotary valves 5 and 6 so that these can be rotated relatively to one another only against the force of the springs and, in the absence of a force, are returned to a neutral central position.

The two rotary valves 5 and 6 form a main valve 17 which, on rotation of the steering shaft 8, opens depending on the direction of rotation and leaves pressure medium from a pump 18 to an operating motor (not shown) and establishes the return connection to the tank 19. The measuring motor 9 is upstream of the main valve 17. By turning the gear 11, the first rotary valve 5 is carried along by way of the cardan shaft 23 and the pin 13. The main valve therefore closes when the measuring motor 9 has followed along through the same angle that was applied to the second rotary valve 6 by means of the steering shaft 8.

Figure 4:
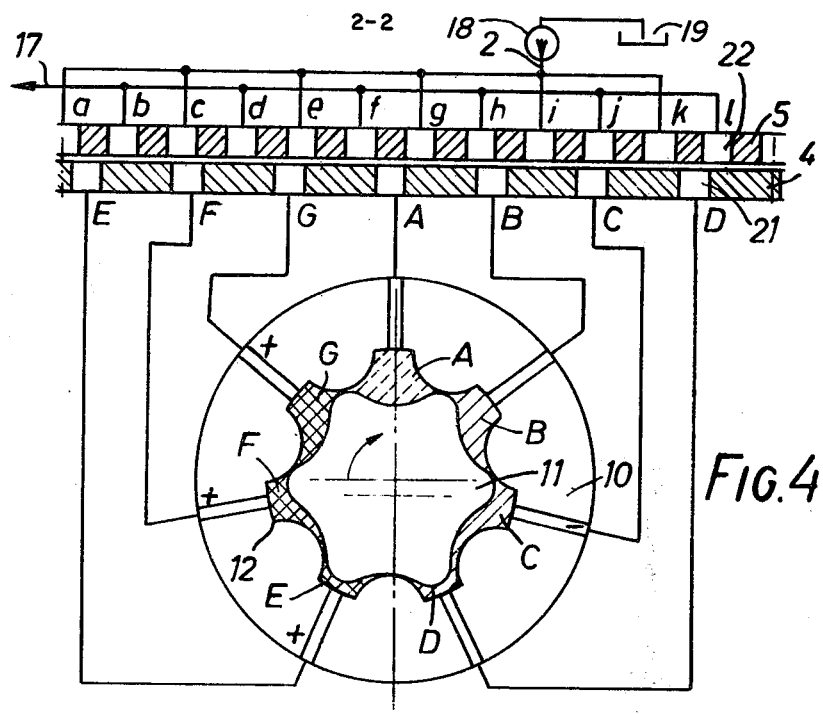
FIG. 4 shows the measuring motor with angled distributing valve in a normal operating position.

The bore 4 of the housing 1 forms the first part of a distributing valve 20. This is fixed for rotation together with the gear 10. It has valve apertures 21 each in communication with one compression chamber 12. The second part of the distributing valve is formed by the first rotary valve 17 which is connected to the gear 11 by way of the cardan shaft 23 for rotational entrainment therewith and possesses twelve distributing apertures 22 which are alternately connected to the inlet (pump connection 2) and the outlet (connection to the main valve 17). This leads to a manner of operation as shown in FIG. 4. The valve apertures 21 are designated A-G. They correspond to the compression chambers 12 with the same designation. The distributing apertures 22 are designated a-l. Of these, the distributing apertures a, c, e, g, i, k are disposed at the inlet side and the distributing apertures b, d, f, h, j, l at the outlet side. Consequently, in the illustrated position of the gear 11 the compression chambers E, F, G carry the pump pressure, the compression chambers B, C, D are at the intermediate pressure at the outlet side whilst in the compression chamber A a pressure change is just taking place. Consequently, the gear 11 turns in the direction of the arrow and takes along the rotary valve 5 so that the pressure conditions remain the same at both sides of the plane of symmetry S determined by the axes of the gears.

When the pump pressure is absent, i.e. the rotary valve 5 does not follow the measuring motor 9, after a certain amount of rotation of the steering shaft 8 the pin 13 and thus the rotary valve 5 and the gear 11 of the measuring motor 9 are taken along by the lost motion clutch 14. The measuring motor now operates as a pump. At the inlet side there is suction pressure. This opens a check valve 24 so that compressed liquid can be sucked in from the tank 19. However, if the compressed volume per revolution remains the same as during motor operation, very considerable torques have to be applied through the steering shaft 8. This is avoided by the rotatability between the two parts 4 and 5 of the distributing valve 20 as will hereinafter be described.

Figure 2:
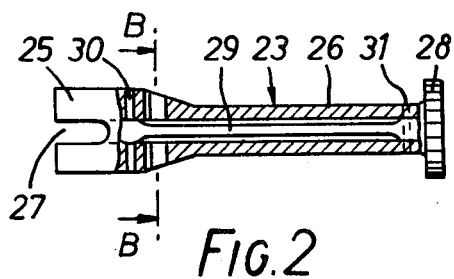
FIG. 2 is an enlarged representation of the cardan shaft of FIG. 1 as a section on line A—A in FIG. 1.
Figure 3:
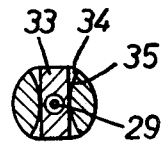
FIG. 3 is a cross-section through the cardan shaft along the line B—B in FIG. 2.

The cardan shaft 23 consists of two sections 25 and 26 each carrying an articulation head, in this case with a slot 27 for the pin 13 or with teeth 28. The two sections are interconnected by a spring torsion rod 29 which may be secured at its ends for example by pins 30 and 31. In addition a torque or lost motion clutch 32 is provided between the two parts. For this purpose the section 26 possesses an extension 33 which has oblique abutment faces 35 engaging in a recess 34 of the other section 25 as is shown in FIGS. 2 and 3.

During normal operation, the spring torsion rod 29 is sufficiently stiff to transmit the small torque required to carry along the rotary valve 5 by the motor 9. However, during emergency control operation considerably higher torques have to be transmitted along this path. The spring rod 29 twists and therefore forms an actuating device which permits the torque clutch 32 to respond. After turning through an angle α predetermined by the abutment faces 35, rotational entrainment is effected non-positively through this torque or lost motion clutch.

Figure 5:
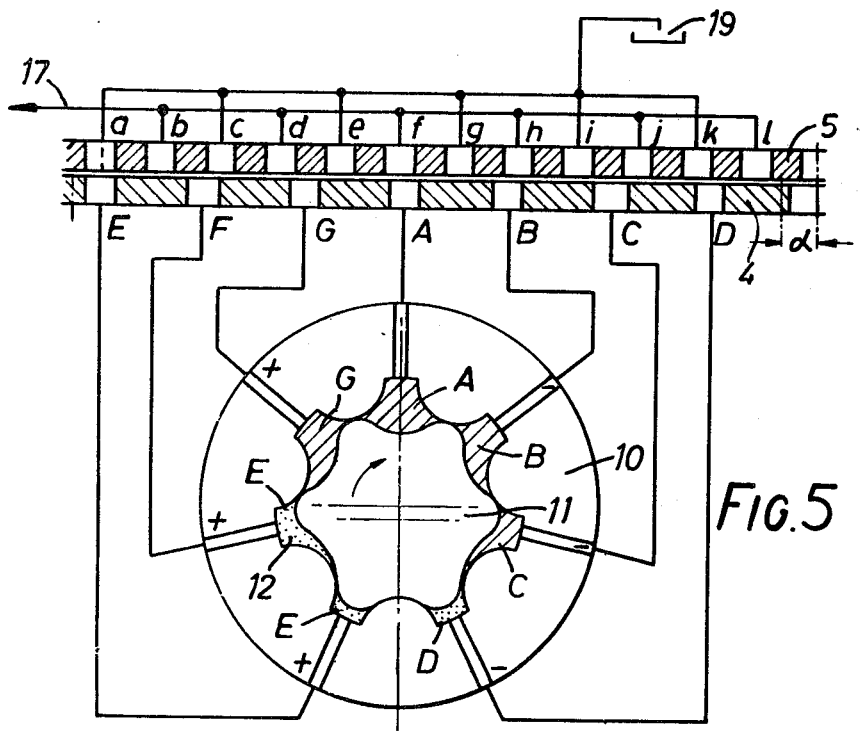
FIG. 5 shows the measuring motor with angled distributing valve during emergency control operation.

This rotation within the cardan shaft 23 leads to a change in the relative position between the gear 11 and the associated distributing valve part 5. This is shown in FIG. 5. It will be seen that the compression chambers A, B, C and G are connected to the outlet side which leads to the main valve 17 and is now under pressure. Since the effects of the chambers B and G balance each other out, the effective fed volume is determined only by the reduction in the chambers A and C. This leads to a considerable reduction in the fed volume and thus in the steering forces to be applied. This distribution is even maintained when the gear 11 is continued to be turned in the direction of the arrow. Suction obtains in the chambers D, E and F.

Constructions other than the illustrated spring torsion rod can be considered as the actuating apparatuses. As spring means one can for example also use leaf springs such as those connected as leaf springs 15 between the rotary slides 5 and 6. However, other slip clutches are also conceivable, such as those used for torque spanners.

I claim:

1. A hydraulic steering device, comprising, a casing having fluid passages and inlet and outlet ports, a metering motor having an inner toothed wheel attached to said casing and an eccentrically and an inner positioned outer toothed wheel with one fewer teeth having rotatable and orbital movement relative to said inner toothed wheel, said toothed wheels intermesh to form expanding chambers on one side of the line of eccentricity and contracting chambers on the other side of said line during relative movement between said wheels, inner and outer rotary distributing valves in said casing, a steering wheel coupling for said outer valve, lost motion drive means between said valves for allowing a limited range of relative movement between said valves which includes a neutral position between two changeover positions, a cardan drive shaft connected between said inner valve and said inner wheel, lost motion emergency operation clutch means between opposite ends of said cardan shaft presenting substantially more turning resistance in both directions than said lost motion drive means between said valves, said clutch means allowing a sufficient relative displacement between said inner valve and said inner wheel to provide an out-of-phase condition wherein fluid from said inlet port is drawn into both expanding and contracting chambers to substantially reduce the feed volume and consequently the steering forces to be applied.

2. A hydraulic steering device according to claim 1 wherein the lost motion angle of said clutch means is about 30 to 40 per cent of the pitch of said inner distributing valve.

3. A hydraulic steering device according to claim 2 wherein said inner wheel has six teeth and said lost motion angle is about 10 to 12 degrees.

4. A hydraulic steering device according to claim 1 wherein said cardan shaft comprises two sections each with an articulated head, said lost motion clutch means including spring means.

5. A hydraulic steering device according to claim 4 wherein said spring means comprises a torsion rod.

* * * * *